Feb. 6, 1962 E. R. MACE 3,020,422
TIME SEQUENCE CONTROL CIRCUIT
Filed July 24, 1959
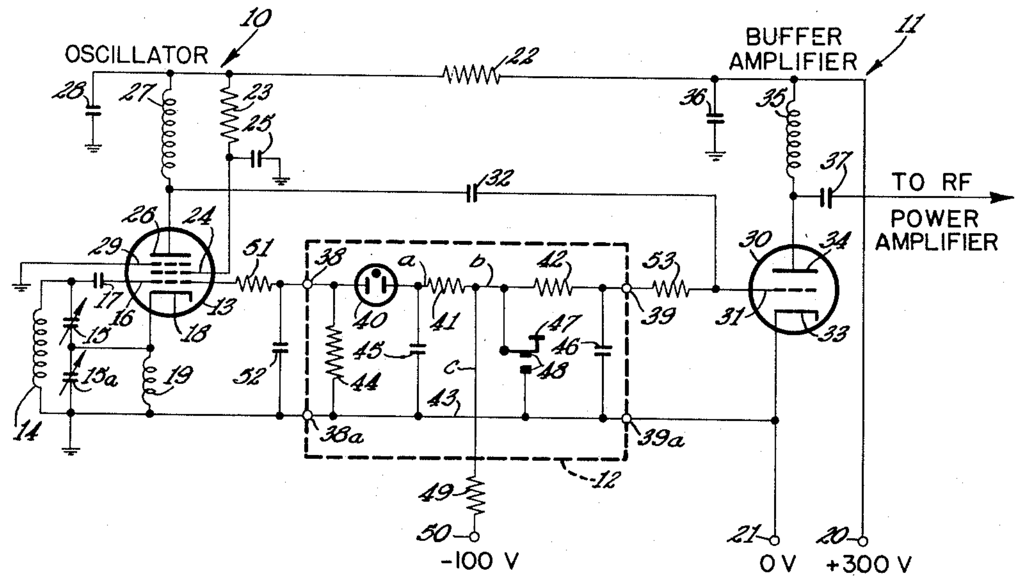
INVENTOR.
ELLIS R. MACE
BY [signature]
ATTORNEY United States Patent Office 3,020,422

Patented Feb. 6, 1962

3,020,422
TIME SEQUENCE CONTROL CIRCUIT

Ellis R. Mace, Council Bluffs, Iowa, assignor to Daystrom, Incorporated, Murray Hill, N.J., a corporation of New Jersey Filed July 24, 1959, Ser. No. 829,447
3 Claims. (Cl. 307—109)

This invention relates to a control circuit and more particularly to a control circuit for rendering a plurality of electronic circuits in association therewith operative and inoperative in a predetermined manner.

Radio transmitters utilized for the purpose of transmitting interrupted continuous waves require, as those knowledgeable in the are know, the use of special keying circuits in order to eliminate various undesirable phenomena attending the keying operation. Among these undesirable phenomena are key clicks, key thumps, chirping and interference with the proper function of nearby electrical apparatus. Various types of circuits have been employed in the past to reduce or eliminate these undesirable phenomena or some of them, such as click filter circuits, grid blocking circuits, and primary keying circuits, to name a few. Generally speaking, many of the prior art circuits leave much to be desired, inasmuch as some of these circuits only partially eliminate the undesirable phenomena, other are relatively expensive, still others are critical of adjustment and yet others produce satisfactory results only after considerable cut and try, since with a given transmitter circuit accurate prediction of the most effective circuit is not always possible.

It is an object of this invention, therefore, to control the keying of a continuous wave transmitter in such a manner as to obviate the above disadvantages.

It is another object of this invention to provide a control circuit for supplying a control potential to each of a plurality of electronic circuits adapted to be coupled to the control circuit to thereby render the electronic circuits operative in a predetermined sequence and inoperative in a predetermined sequence.

Another object is to control the operation of a radio transmitter in such manner as to eliminate the undesirable key clicks and chirping resulting from the keying of the transmitter.

One of the features of the invention is the elimination of the undesirable key clicks and chirping associated with the keying of a radio transmitter by the use of a relatively simple and inexpensive control circuit.

Other objects, features and advantages of the invention will become apparent from a reading of the specification taken in conjunction with the drawing which shows a schematic wiring diagram of the control circuit in accordance with the principles of the invention, and shown in association with various stages of a continuous wave transmitter for controlling the operation thereof.

Briefly, the invention contemplates a control circuit having a first pair of terminals and a first time delay network coupled to the first pair of terminals through a network comprising a gas discharge device in combination with an impedance. A second pair of terminals is also provided and the control circuit further includes a second time delay network coupled to the first time delay network and to the second pair of terminals. Each time delay network includes a capacitor in combination with an impedance of a non-capacitive nature. A source of potential is provided for application to the control circuit, and switching means is further provided to selectively control the application of the potential to the time delay networks and the effective removal thereof from the time delay networks.

When the switching means is in a deactuated position, and the potential source is applied to the control circuit, the capacitors in the time delay networks become charged and a resultant first electrical condition exists across each of the pairs of terminals. When the switching means is actuated, the potential source is effectively disconnected from the control circuit and the capacitors in the first and second time delay networks are caused to discharge to thereby produce in time sequence a second electrical condition across each of the pairs of terminals. When the switching means is then deactuated, the potential source is effectively re-connected to the control circuit and the capacitors in the time delay networks begin to recharge to again produce the first electrical condition across each of the pairs of terminals in time sequence.

The first and second pair of terminals can be connected respectively to a first and second electronic circuit to render these circuits operative in time sequence and inoperative in time sequence in accordance with the electrical condition produced at the pairs of terminals.

Referring now to the drawing, there is shown a portion of a transmitter circuit including an oscillator stage designated generally by the numeral 10 and having its output coupled to a buffer amplifier stage indicated generally by the numeral 11. A control circuit designated by the portion of the circuit included within the dashed line rectangle 12 is also provided and is coupled between the oscillator and the amplifier.

The oscillator 10 is shown in the drawing as a variable frequency oscillator of the Colpitts electron coupled type and employing a pentode tube 13. A frequency determining parallel type tank circuit is provided and comprises an inductance 14 and the variable capacitors 15 and *15a*. The top of this tank circuit is connected to the control grid 16 through a capacitor 17 and the bottom of the tank circuit is returned to the cathode 18 through an RF choke 19. Further, the cathode is directly connected to the common connection between the two variable capacitors 15 and *15a*.

A source of potential, not shown, is also provided for impressing a suitable positive potential on the terminal 20, with respect to the terminal 21, the latter terminal being at ground or zero potential. The positive potential on the terminal 20 is reduced to a proper value for application to the oscillator stage 10 by a suitable voltage dropping resistor 22. A screen grid potential dropping resistor 23 further reduces the potential applied to the screen grid 24 for proper operation of the pentode 13. The screen grid circuit is also provided with the usual bypass capacitor 25. The positive anode potential is applied to the pentode plate 26 through a suitable load inductance 27, one end of the inductance being maintained at RF ground potential by a suitable capacitor 28. The suppressor grid 29 is maintained at ground potential by a direct electrical connection.

The buffer amplifier tube 30 may be a triode, a tetrode or a pentode, but for the sake of simplicity is shown as a triode. The grid 31 of the buffer amplifier is coupled to receive the output of the oscillator tube 13 by means of a coupling capacitor 32 connected to the oscillator plate 26. The cathode 33 of the amplifier tube is connected directly to ground potential and the plate 34 is connected to the positive potential terminal 20 through a suitable load inductance 35, one end of the inductance being maintained at RF ground potential by a capacitor 36. A coupling capacitor 37 couples the output of the buffer amplifier tube 30 to the following stage which may be, for example, an RF power amplifier.

The control circuit within the dashed line rectangle 12 may be considered for descriptive purposes to have a pair of terminals 38 and *38a* for coupling the control circuit to the oscillator tube 13 and a pair of terminals 39 and *39a* for coupling the control circuit to the buffer amplifier tube 30. The terminals *38a* and *39a* are connected together by a common conductor 43, which is maintained at ground potential.

The control circuit includes a number of components the relationship of which may be described in the following manner: Connected in series in sequence between the terminal 38 and the terminal 39 are a gas discharge device such as a neon lamp 40, a resistance 41 and a resistance 42. A resistance 44 is connected between the terminal 38 and the common conductor 43. A capacitor 45 is connected between the wire *a* and the common conductor 43. A capacitor 46 is connected between the terminal 39 and the common conductor 43. A switching means or key 47 having a pair of contacts 48 is connected between the wire *b* and the common conductor 43. The wire *b* is further connected by a wire *c* through a resistance 49, to a point of biasing potential 50, which is negative with respect to the ground potential terminal 21. The potential at terminal 50 must have a sufficient value to render the tubes 13 and 30 in a cut off condition, under certain circumstances, as will later appear.

The resistance 41 and the capacitor 45 together define a first time delay resistance-capacitance or RC network and the resistance 42 and capacitor 46 together define a second time delay resistance-capacitance or RC network. For purposes of the control circuit described herein, a time delay network refers to any circuit which will produce a significant time lag from the instant a change of electrical condition is initiated until the desired result brought about by that initiation is produced.

The first RC network portion of the control circuit, in association with the neon lamp 40 and resistance 44, is coupled, through the terminals 38—38*a* and by means of a suitable network comprising a resistance 51 and capacitor 52, to the input of the oscillator tube 13 (i.e., between the control grid and cathode electrodes). In similar fashion, the second RC network portion of the control circuit comprising the resistance 42 and capacitor 46, is coupled, through the terminals 39—39*a* and by means of a suitable resistance 53, between the control grid and cathode of the amplifier tube 30. The present circuit contemplates, in accordance with one manner of operation, the use of a first and second time delay or RC network having time constants differing from one another.

The operation of the circuit of FIGURE 1 will now be described. With the typical potentials as indicated on the various potential terminals 20, 21, and 50 maintained on the circuit of the drawing and the key 47 in the open position so that the contacts 48 are separated, the RC network capacitors 45 and 46 will be charged, the control grids of the oscillator tube 13 and the amplifier tube 30 will both be at or beyond cutoff and these tubes will therefore be maintained in a first electrical condition; i.e., non-conductive.

While this condition prevails, the neon bulb 40 will be lighted and therefore conductive and a current will flow from the common conductor 43 through the resistance 44, causing it to function as a potential developing impedance, through the neon bulb 40, the resistance 41, the resistance 49, and to the terminal 50. The potential thus developed across the resistance 44, which is connected between the cathode 18 and grid 16, has such a polarity and value as to maintain the oscillator tube 13 inoperative. The amplifier tube 30 is maintained inoperative by the direct application between the cathode 33 and the grid 31 of substantially the entire biasing potential existing between the terminals 21 and 50.

When the key 47 is closed, a direct electrical path is produced between the wire *b* and the common conductor 43. This results in the effective removal of the biasing potential on the terminal 50 from the control circuit and also provides a path for discharge of the first and second RC network capacitors 45 and 46 respectively. Thus both the first and second RC networks will begin to discharge. The first RC network 41, 45, has a shorter time constant than the second RC network 42, 46, and therefore the capacitor 45 will discharge faster than the capacitor 46, thus extinguishing the neon lamp 40 and removing the cutoff bias potential from the oscillator tube 13 a fraction of a second before the bias on the buffer tube 30 drops below cutoff. Thus the oscillator stage 10 is rendered operative a short interval before the amplifier stage 11. So long as the key 47 is depressed, these two stages will remain operative. It should be here noted that the capacitor 52 discharges through the resistor 44, as also does the capacitor 45 until the neon lamp becomes extinguished. The discharge of the capacitor 52, however, has substantially no effect on the circuit since its capacity value is only a small fraction of the value of the capacitor 45.

When the key is opened, the capacitors 45 and 46 in the first and second RC networks begin to charge. Although the second RC network charges more slowly than the first RC network, since its time constant is longer, the amplifier tube grid will be cut off a fraction of a second before the oscillator tube grid because the first RC network must reach the comparatively high firing voltage of the neon bulb before it becomes conductive so that current will flow through it to produce the oscillator grid cutoff potential across the resistor 44.

It will be seen that the control circuit described above operates in such a manner that at the instant the transmitter key is depressed, neither the oscillator stage 10 nor the amplifier stage 11 is operative. However, at the instant the key is closed, the capacitor discharge time delay feature of the control circuit becomes operative and renders the oscillator and the buffer amplifier operative sequentially, in that order. Since the amplifier is not operative at the instant the key is closed, the undesirable key click effect produced in the oscillator stage by the key closing operation is not transmitted through the amplifier.

The undesirable effect produced in the oscillator stage by the key opening operation is eliminated in a similar manner. Thus, at the instant the key is opened, the capacitor charge time delay feature of the control circuit becomes operative and renders the amplifier inoperative and the oscillator inoperative sequentially, in that order.

While the invention has been described with respect to the control of specific first and second electronic circuits employing respectively electron discharge devices 13 and 30, it is clear that the invention is not limited thereto.

Since many changes could be made in the above circuit and many apparently widely different embodiments of this invention could be made without departing from the scope thereof, it is intended that all matter contained in the above description or shown in the accompanying drawings shall be interpreted as illustrative and not in a limiting sense.

I claim:

1. A control circuit for producing control potentials between a pair of first and second terminals and a pair of third and fourth terminals comprising, a gas discharge device, a first resistance and a second resistance connected in series between said first and third terminals, said first resistance being connected between said discharge device and said second resistance, a common conductor connected between said second and fourth terminals, a potential developing resistance connected between said first and second terminals, a first capacitor connected to the connection between said discharge device and said first resistance and to said common conductor, a second capacitor connected between said third and fourth terminals, switching means connected between said common conductor and the connection between said first and second resistances, and an impedance and a potential source connected in series across said switching means.

2. A control circuit for producing control potentials between a pair of first and second terminals and a pair of third and fourth terminals comprising, a neon lamp, a first resistance and a second resistance connected in series between said first and third terminals, said first resistance being connected between said neon lamp and said second resistance, a common conductor connected between said second and fourth terminals, a potential developing resistance connected between said first and second terminals, a first capacitor connected to the connection between said neon lamp and said first resistance and to said common conductor, said first capacitor and said first resistance forming a first time delay network, a second capacitor connected between said third and fourth terminals, said second resistance and said second capacitor forming a second time delay network, a switch connected between said common conductor and the connection between said first and second resistances, and a current limiting resistance and a potential source connected in series across said switch.

3. A control circuit for controlling the operation of a first and a second circuit comprising, first and second conductors coupling said control circuit to said first circuit and third and fourth conductors coupling said control circuit to said second circuit, a gas discharge device, a first resistance and a second resistance connected in series between said first and third conductors, said first resistance being connected between said discharge device and said second resistance, said second and fourth conductors being joined by a common conductor, a potential developing resistance connected between said first and second conductors, a first capacitor connected to the conductor joining said discharge device with said first resistance and to said common conductor, said first capacitor and said first resistance forming a first time delay network, a second capacitor connected between said third and fourth conductors, said second resistance and said second capacitor forming a second time delay network having a longer time constant than said first time delay network, switching means connected between said common conductor and the connection between said first and second resistances, a potential source and an impedance connected in series across said switching means, said potential source maintaining said capacitors in a charged condition and said first and second circuits in an inoperative condition when said switching means is open, said switching means when closed providing a discharge path for each of said time delay networks to thereby render said first circuit operative and then said second circuit operative, said switch when reopened causing said capacitors to recharge to thereby return said second circuit to said inoperative condition, said first circuit being delayed in returning to its operative condition until the charging potential across said first capacitor reaches the firing potential of said gas discharge device.

References Cited in the file of this patent

UNITED STATES PATENTS

| | | |
|---|---|---|
| 2,113,371 | Dyson | Apr. 5, 1938 |
| 2,114,332 | Bruckner et al. | Apr. 19, 1938 |
| 2,404,754 | Simpson | July 23, 1946 |
| 2,405,843 | Moe | Aug. 13, 1946 |